(12) United States Patent
Schmid et al.

(10) Patent No.: US 10,576,408 B2
(45) Date of Patent: Mar. 3, 2020

(54) FILTER ELEMENT, IN PARTICULAR FOR GAS FILTRATION

(71) Applicant: MANN+HUMMEL GmbH, Ludwigsburg (DE)

(72) Inventors: Daniel Schmid, Sachsenheim (DE); Ivanka Poljak, Göteborg (SE); Ulrich Launer, Stuttgart (DE); Thomas Siegele, Benningen (DE)

(73) Assignee: MANN+HUMMEL GmbH, Ludwigsburg (DE)

(*) Notice: Subject to any disclaimer, the term of this patent is extended or adjusted under 35 U.S.C. 154(b) by 134 days.

(21) Appl. No.: 15/819,798

(22) Filed: Nov. 21, 2017

(65) Prior Publication Data
US 2018/0071671 A1    Mar. 15, 2018

Related U.S. Application Data

(63) Continuation of application No. PCT/EP2016/060816, filed on May 13, 2016.

(30) Foreign Application Priority Data

May 22, 2015   (DE) .................. 10 2015 006 496

(51) Int. Cl.
*B01D 46/10* (2006.01)
*B01D 46/52* (2006.01)
*B01D 46/00* (2006.01)

(52) U.S. Cl.
CPC ....... *B01D 46/521* (2013.01); *B01D 46/0002* (2013.01); *B01D 2279/30* (2013.01)

(58) Field of Classification Search
CPC ........... B01D 46/0002; B01D 46/0005; B01D 46/10; B01D 46/521; B01D 2265/06; B01D 2279/30
USPC ...... 55/320, 385.3, 492, 493, 511, 498, 502, 55/503, 497; 123/198 E
See application file for complete search history.

(56) References Cited

U.S. PATENT DOCUMENTS

| | | | |
|---|---|---|---|
| 5,391,212 A | 2/1995 | Ernst et al. | |
| 6,231,630 B1 | 5/2001 | Ernst et al. | |
| 7,789,924 B2* | 9/2010 | Waltenberg | B60R 21/34 123/198 E |
| 2001/0025471 A1* | 10/2001 | Fries | B01D 46/106 55/320 |
| 2002/0069625 A1* | 6/2002 | Stass | F02M 35/0203 55/385.3 |
| 2010/0006172 | 8/2010 | Weber et al. | |
| 2012/0186207 A1* | 7/2012 | Ushiyama | B01D 46/0005 55/493 |

(Continued)

FOREIGN PATENT DOCUMENTS

DE   20112440 U1   12/2001
EP    1144083 A1   10/2001

*Primary Examiner* — Minh Chau T Pham
(74) *Attorney, Agent, or Firm* — James Hasselbeck

(57) ABSTRACT

A filter element has a filter medium body with a raw side and a clean side. A support element is connected to the filter medium body and supports the filter element in a filter housing receiving the filter element. The support element is arranged on the clean side of the filter medium body. The support element is separated from the raw side of the filter medium body by the material of the filter medium body. A filter device with such a filter element and with a corresponding filter housing is provided.

16 Claims, 4 Drawing Sheets

(56) References Cited

U.S. PATENT DOCUMENTS

2014/0318092 A1* 10/2014 Rieger .............. B01D 46/0001
                                                     55/511
2015/0007533 A1   1/2015 Hasenfratz et al.
2015/0337778 A1* 11/2015 Wagner ............. B01D 46/0047
                                                     55/385.3
2016/0023137 A1   1/2016 Sorger et al.
2016/0123282 A1*  5/2016 Holzwarth ......... F02M 35/0204
                                                     55/492

* cited by examiner

__US 10,576,408 B2__

FILTER ELEMENT, IN PARTICULAR FOR GAS FILTRATION

CROSS-REFERENCE TO RELATED APPLICATIONS

This application is a continuation application of international application No. PCT/EP2016/060816 having an international filing date of 13 May 2016 and designating the United States, the international application claiming a priority date of 22 May 2015, based on prior filed German patent application No. 10 2015 006 496.7, the entire contents of the aforesaid international application and the aforesaid German patent application being incorporated herein by reference.

BACKGROUND OF THE INVENTION

The invention relates to a filter element, in particular for gas filtration, for example, for an air filter, comprising a filter medium body.

In EP 2 223 727 A1, an air filter for filtration of the intake air for an internal combustion engine is described, wherein the air filter comprises a plate-shaped filter medium body whose oppositely positioned exterior sides form the raw side and the clean side. At the clean side, the filter medium body is framed by a circumferentially extending seal. The filter element with the filter medium body is received in a filter housing. For fixation of the filter element in the filter housing, a recess between raw side and clean side is introduced centrally into the filter medium body of the filter element. A damping element is inserted into the recess wherein support sleeves of a housing base component and of a housing cover of the filter housing are contacting oppositely positioned sides of the damping element and are supported by means of the intermediately positioned damping element. The damping element which is inserted into the recess separates also the clean side from the raw side in a flow-tight manner.

In EP 1 144 083 B1, an air filter for an internal combustion engine is described whose filter element comprises a filter medium body that is embodied as a folded filter. In this case, for fixation of the filter element in a receiving filter housing, a recess is also introduced centrally into the filter medium body into which support sleeves on a housing base component and on a housing cover are projecting. The housing sleeves are connected to each other by a screw.

According to an embodiment variant of EP 1 144 083 B1, a housing-associated blade projects into a fold of the filter medium body down to the fold bottom and is connected by means of a screw that is extending through the material of the filter medium body with a support element that is contacting the oppositely positioned side of the fold.

SUMMARY OF THE INVENTION

It is the object of the invention to accommodate a filter element stably in a filter housing with simple constructive measures and with as little as possible impairment of the flow and of the cleaning performance.

This object is solved according to the invention in that for supporting the filter element in a receiving filter housing a support element is connected with the filter medium body and is located on the clean side of the filter medium body, wherein the support element is separated from the raw side by the material of the filter medium body.

The dependent claims provide expedient further embodiments.

The filter element according to the invention is preferably used for gas filtration, for example, for filtration of the combustion air that is supplied to an internal combustion engine. However, an application for liquid filtration is also conceivable.

The filter element comprises a filter medium body which is flowed through by the fluid to be cleaned between inflow side and outflow side. The filter medium body is preferably embodied plate-shaped or parallelepipedal and comprises flat inflow and outflow sides which are preferably positioned parallel to each other. As a filter medium for the filter medium body, for example, a material on the basis of paper or cellulose is employed. The filter medium body is preferably embodied as a folded filter and comprises parallel extending filter folds, wherein the fold tips are positioned on the inflow side and the outflow side, respectively, so that the fold plane is extending approximately at a right angle to the plane of the inflow side and/or outflow side of the filter medium body. Instead of an embodiment of the filter medium body as a folded filter, embodiments of a block-type compact material are conceivable also.

For supporting the filter element in a receiving filter housing, the filter medium body is provided with a support element which is located on the clean side or outflow side of the filter medium body and covers only a partial surface area of the clean side, preferably less than 10%. The support element is connected with the filter medium body, in particular fixedly or non-detachably connected, wherein also a detachable connection is conceivable, as needed. The support element forms a part of the filter element so that the filter element with the filter medium body and the support element forms a contiguous component unit. The support element is located only on the clean side or outflow side of the filter medium body; it is separated from the raw side or inflow side by the material of the filter medium body. Round as well as non-round cross sections of the support element are conceivable, for example, elongate cross sections.

This embodiment has various advantages. For the support of the filter element in the receiving filter housing, it is not required to provide a continuous recess between raw side and clean side in the filter medium body. Accordingly, the filter medium body of the filter element according to the invention has no continuous recess between raw side and clean side so that, on the one hand, the filtration surface area is increased and, on the other hand, an impairment of the flow conditions by such a recess is avoided. Moreover, no additional measures for separating the raw side from the clean side and preventing leakage air flows through such a recess are required. As a whole, the filtration is improved and the expenditure for manufacturing the filter element is reduced.

The support of the filter element in the filter housing by means of the clean side of the filter medium body ensures stability over an extended operating period and under different operating conditions. It is in particular ensured that even for a wet filter element the material of the filter medium body does not bulge toward the clean side under the pressure of the fluid passing through. By means of the support on the clean side, such a bulge is prevented despite the forces of the fluid flowing through acting on the filter medium body.

The raw side and the clean side of the filter medium body are preferably each embodied with a straight surface. In an alternative embodiment, either one of the sides or both sides are embodied to be curved.

According to a further expedient embodiment, at least a part of the support element is resting on the clean side exterior surface of the filter medium body. The support element projects thus past the clean side of the filter medium body which facilitates a supporting action immediately on the support element and reduces the risk that the counter support element on the receiving filter housing accidentally comes immediately into contact with the filter medium body. In an alternative embodiment, it can be expedient however that the support element does not project past the clean side of the filter medium body but is completely integrated into the filter medium body.

In the embodiment of the filter medium body as a folded filter, the support element extends across at least two neighboring folds so that the relative position of the folds relative to each other is stabilized. It can be expedient that the support element extends across several neighboring folds, for example, across three, four, five, or more folds so that these folds are stabilized correspondingly by the support element.

As a material for the support element, for example, PUR foam is conceivable which is applied in a liquid state onto the clean side of the filter medium body. When the filter medium body is configured as a folded filter, the PUR foam can partially penetrate into the intermediate space between neighboring folds; the material of the support element moreover engages across the fold tips at the clean side of the filter medium body. As a whole, a stable and fixed connection between the material of the support element and the folds of the filter medium body is achieved in this way. The material of the support element extends advantageously only across a partial height of the filter medium body so that the support element is positioned at a spacing from the fold bottom.

According to a further expedient embodiment, the filter element comprises a circumferentially extending seal on the filter medium body in order to flow-tightly separate the clean side from the raw side in the installed state. The seal is located advantageously in the region of the clean side of the filter medium body. It can be expedient to manufacture the seal and the support element on the clean side of the filter medium body of the same material, for example, of a PUR foam. The support element is located advantageously at a spacing from the seal on the clean side of the filter medium body.

The filter device that comprises the filter element comprises a filter housing into which the filter element can be inserted and that also takes over the flow guiding action of the fluid to be cleaned. On a housing component of the filter housing, a counter support element is provided which is correlated with the support element on the filter medium body. The cross section of the counter support element is advantageously matched to the cross section of the support element.

In the installed state of the filter element, the counter support element on the filter housing and the support element on the filter element can either be permanently in contact or, in an alternative embodiment, can have relative to each other a small spacing that is bridged and reduced to zero only in case of a deformation of the filter medium body, whereupon the support element comes into contact with the counter support element. The latter embodiment has the advantage that no oscillations and vibrations between the filter housing and the filter element can be transmitted through support element and the counter support element.

The counter support element is located advantageously on the inner side of a housing component and is embodied preferably as one piece together with the housing component. As an alternative embodiment, the counter support element is embodied separate from the housing component but is connected with the housing component, for example, by being clipped on. In case of the one-piece configuration, the housing component is preferably embodied as an injection molded plastic part and the counter support element is integrally injection molded onto the housing component.

The housing component which is carrier of the counter support element is, for example, a housing cover which can be placed onto a housing base body of the filter housing.

According to a further expedient embodiment, the counter support element is embodied as a support sleeve whose end face is contacting the exterior side of the support element on the filter medium body in the support position. The support element on the filter medium body, according to a further expedient embodiment, can have a convex outwardly curved exterior side in order to ensure a small contact surface area between support element and counter support element and in order to reduce friction, in particular transverse to the support direction.

It can also be expedient to provide on the support element on the filter medium body a circumferentially extending support collar which surrounds a centric section of the support element. The circumferentially extending support collar can serve as a support surface wherein in this case the correlated counter support element on the housing component is preferably embodied, for example, as cylindrical or conical hollow body whose end face is contacting the circumferentially extending support collar in the support position. In case the centric section of the support element within the support collar has a convex outwardly curved, for example, part-spherical, side, it projects into the interior of the counter support element and effects centering between the support element and the counter support element.

BRIEF DESCRIPTION OF THE DRAWINGS

Further advantages and expedient embodiments can be taken from the additional claims, the figure description, and the drawings.

In the Figures, same components are provided with same reference characters.

DESCRIPTION OF PREFERRED EMBODIMENTS

The embodiments relate to a filter element and a filter device for gas filtration, for example, for an air filter that is employed in an intake manifold of an internal combustion engine and in which the sucked-in combustion air is filtered.

Figure 1:
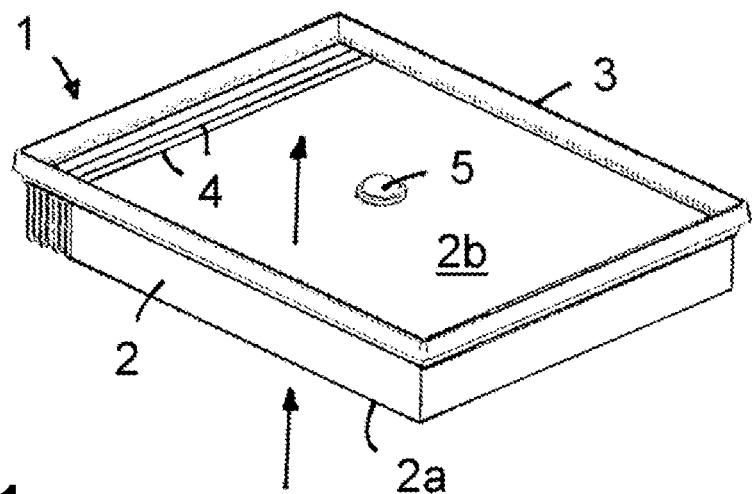
FIG. 1 is a perspective view of a filter element for gas filtration, comprising a support element arranged centrally on the clean side.

The filter element illustrated in FIG. 1 is used for gas filtration and comprises a parallelepipedal filter medium body 2 and a circumferentially extending seal 3 which is arranged in the rim area of the filter medium body 2 and is embodied, for example, as a PUR foam which is injection molded onto the material of the filter medium body 2. The filter medium body 2 is designed as a folded filter and comprises a plurality of parallel filter folds 4. The flow through the filter medium body 2 with gas to be purified is indicated by the arrows. The raw side or inflow side 2a and the clean side or outflow side 2b of the filter medium body 2 are each configured as a plane wherein the raw and clean sides, as a result of the parallelepipedal embodiment of the filter medium body, extend parallel to each other. The oppositely positioned fold tips of the filter folds 4 form the raw side and the clean side 2a, 2b, respectively. The circumferentially extending seal 3 is located on the clean side 2b and projects axially past the plane of the clean side 2b; also, the seal 3 comprises a projection in both directions transverse to the flow direction relative to the filter medium body 2.

Centrally on the clean side 2b, there is a support element 5 in the form of a support pad which is preferably comprised of PUR foam, like the seal 3, and is injection molded onto the clean side 2b of the filter medium body. The support element 5 is located at the center on the clean side 2b and has a spacing in all directions relative to the circumferentially extending seal 3. By application of the sealing material in liquid or partially liquid state, the sealing material can penetrate partially into the filter folds 4 on the clean side 2b and can form a fixed connection with the filter medium body 2. The support element 5 embodied as a pad engages across one or several edges of filter folds 4 in this case. The support element 5 has a convex outwardly curved exterior side and, as needed, can be embodied to be part-spherical.

Figure 2:
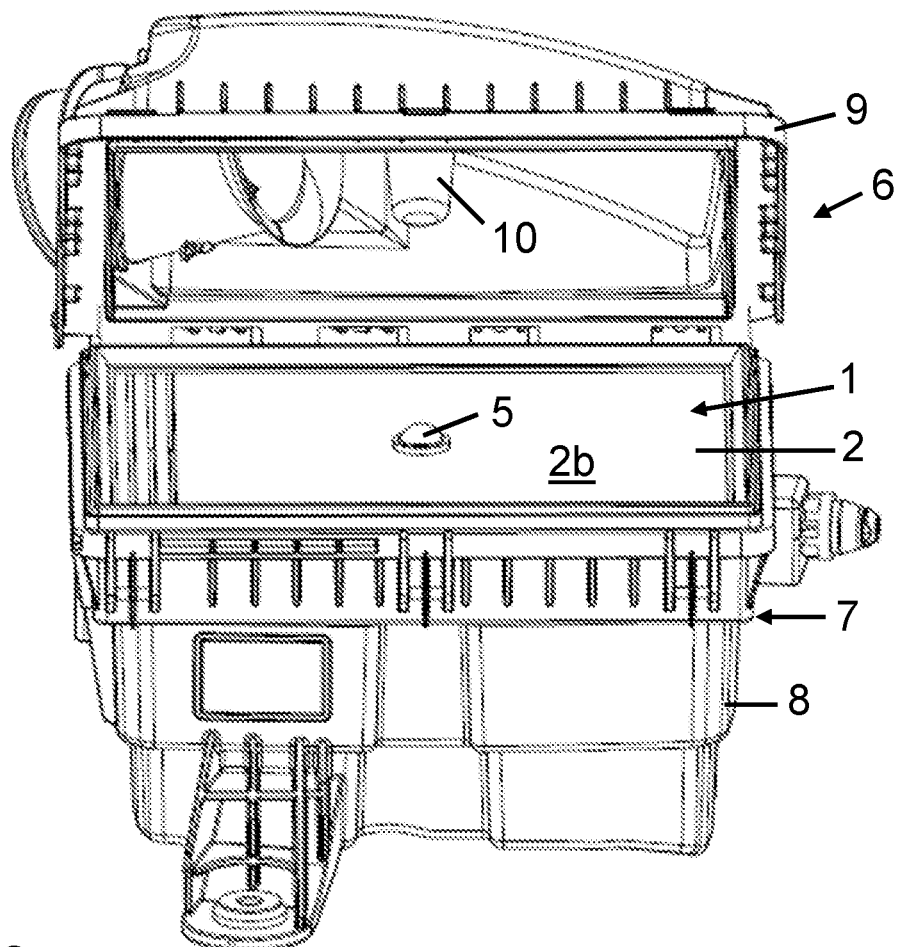
FIG. 2 is a filter device with a filter housing and filter element received therein, wherein on a housing cover a support sleeve is arranged as a counter support element which is correlated with the support element on the filter element.

FIG. 2 shows a filter device 6 with the filter element 1 in a filter housing 7 which is comprised of a base housing 8 and an attachable housing cover 9. The raw side 2a of the filter medium body 2 is positioned in the illustration according to FIG. 2 at the bottom and the clean side 2b at the top so that the filter element 2 is flowed through from bottom to top by the fluid.

On the inner side of the housing cover 9, a counter support element 10 is located which is correlated with the support element 5 on the filter element 1. The counter support element 10 is embodied as a support sleeve which is, for example, approximately cylindrical, optionally conical. By closing the housing cover 9, the free end face of the counter support element 10 comes into contact with the support element 5 that is embodied as a pad on the clean side 2b of the filter medium body 2. In this way, it is prevented that the filter medium body 2 can bulge outwardly at the clean side 2b under the pressure of the fluid flowing through, in particular in a wet state. By means of the supporting action between the support element 5 on the filter medium body 2 and the counter support element 10 on the inner side of the housing cover 9, forces which tend to bulge the filter medium body 2 in the direction of the clean side in outward direction are introduced by means of the counter support element 10 into the housing cover 9. In this way, it is ensured that the filter medium body 2, despite the forces acting on it during the filtration of the fluid, maintains its nominal position and in particular the raw side as well as the clean side of the filter medium body 2 remain at least approximately planar.

Figure 3:
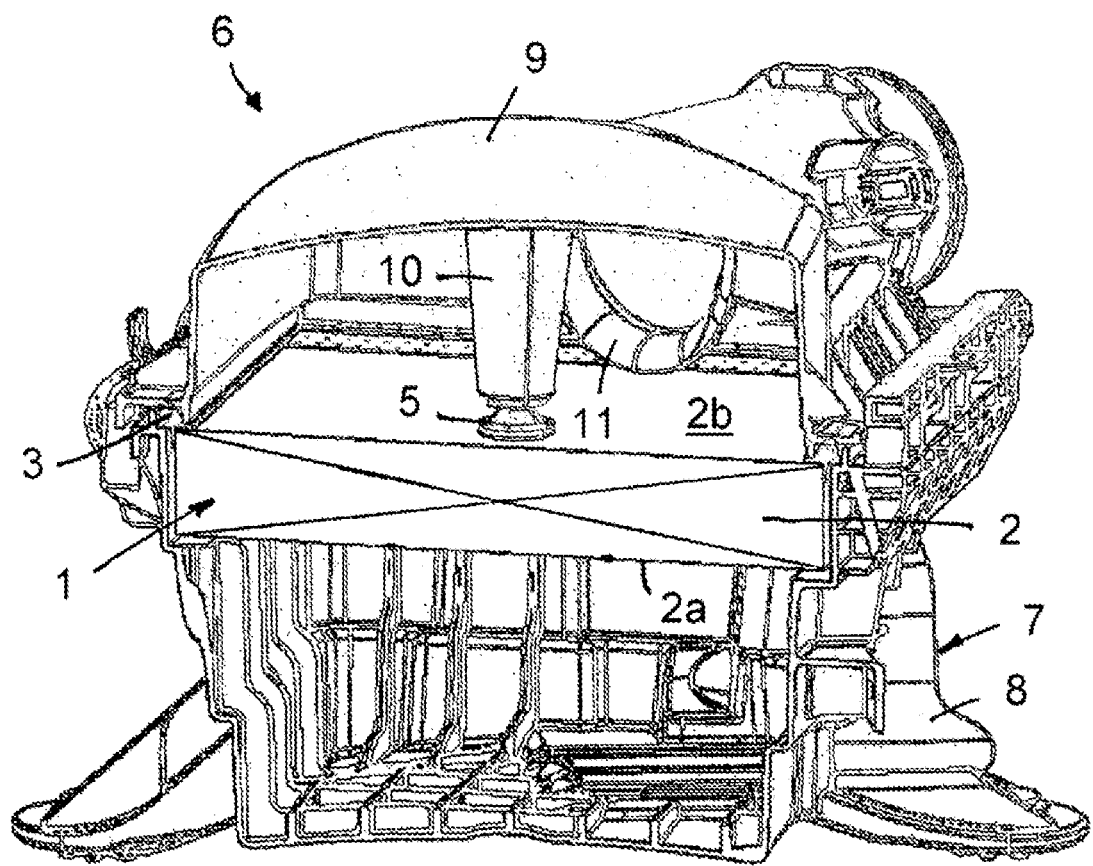
FIG. 3 is a section of the filter device with closed housing cover.

In the section illustration according to FIG. 3, the housing cover 9 is closed; the counter support element 10 is positioned with its free end face on the support element 5 on the filter medium body 2. Due to the convex outwardly curved exterior side of the support element 5, there is only a small contact surface area between support element 5 and counter support element 10 so that, for example, due to vibrations, a relative movement between support element 5 and counter support element 10 is possible transverse to the flow direction. At the same time, however, the supporting action in the flow direction between support element 5 and counter support element 10 is maintained. The small contact surface area reduces the friction between the components 5 and 10 so that the relative movement transverse to the flow direction is possible without tensions between the support elements 5 and 10.

FIG. 3 shows an outflow pipe 11 at the clean side of the filter element 1 by means of which the purified fluid is discharged. The outflow pipe 11 is located in the lateral area of the housing cover 9 and is formed as one piece together with the housing cover 9. The outflow of the purified fluid at the clean side of the filter element 1 is accordingly realized transverse to the flow direction. Introduction of the raw fluid to the raw side 2a of the filter medium body 2 can be realized also, as needed, through an inflow pipe that opens transversely to the flow direction and is formed as one piece together with the base housing 8.

The material of the support element 5 extends only across a partial height into the filter folds 4 of the filter medium body 2. The majority of the material of the support element 5 is located on the exterior side of the clean side 2b and rises from the clean side 2b. Material received between the filter folds 4 does not extend to the base of the folds on the raw side 2a. In any case, the material of the support element 5 is separated from the raw side 2a.

Figure 4:
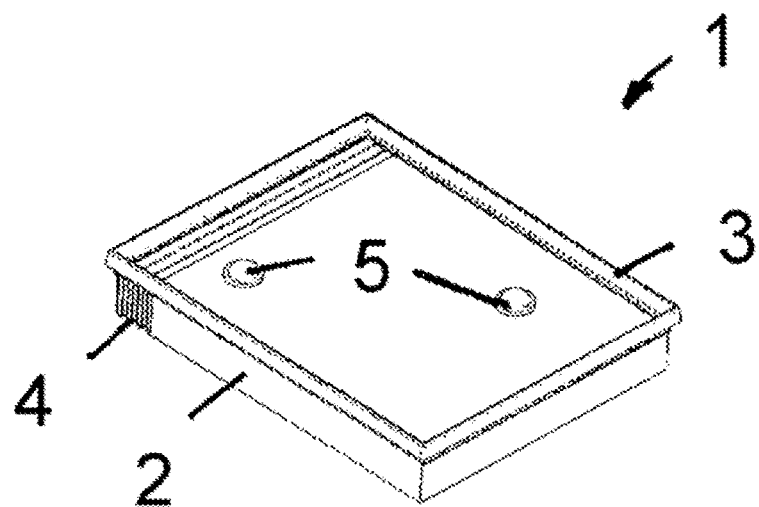
FIG. 4 is a perspective view of a filter element in an embodiment variant with two support elements arranged on the clean side.
Figure 5:
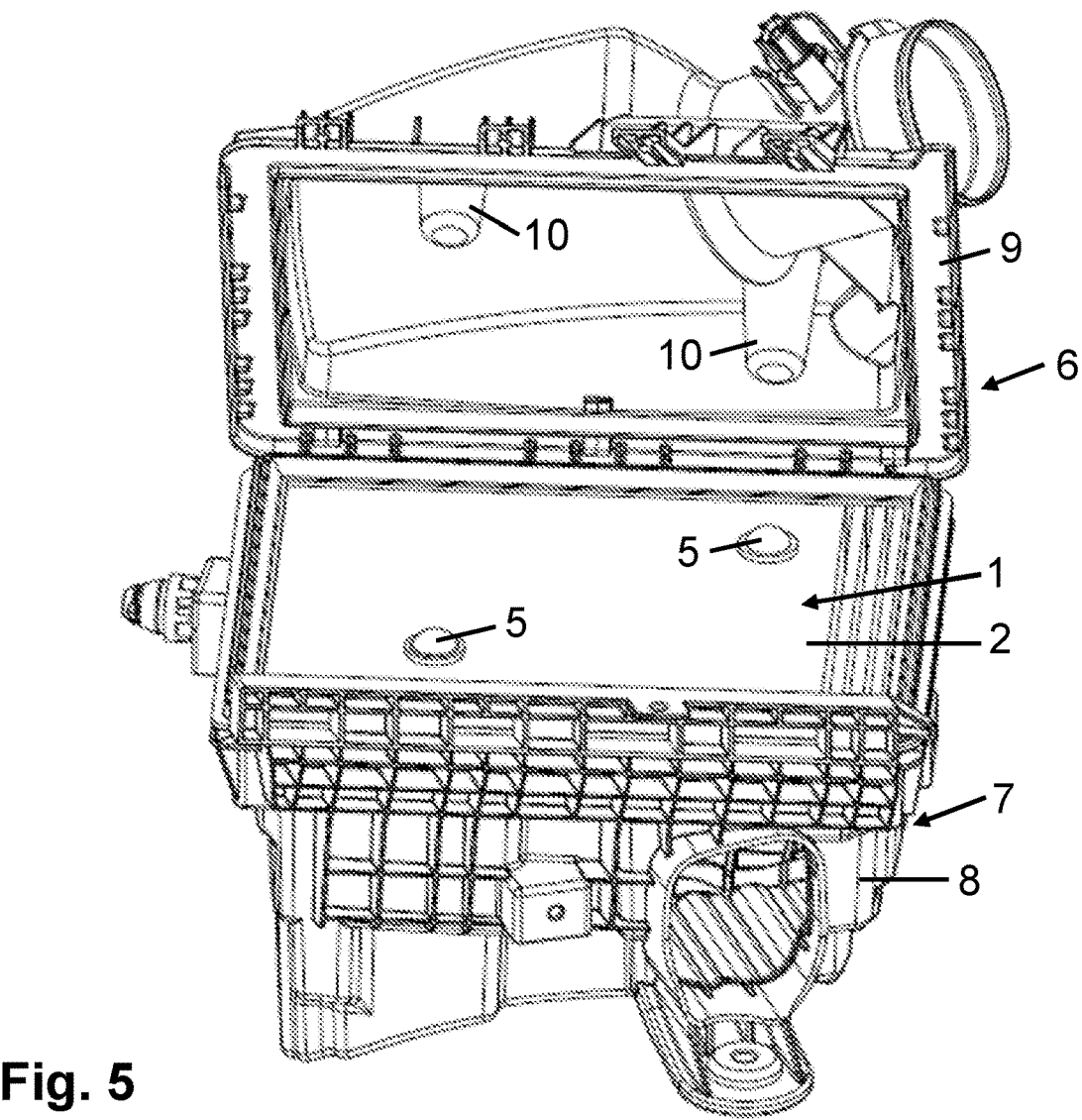
FIG. 5 is a filter device with the filter element according to FIG. 4, wherein on the housing cover two support sleeves are arranged as counter support elements which are correlated with the support elements on the filter element.

In FIGS. 4 and 5, a further embodiment with a plate-shaped or parallelepipedal filter element 1 is illustrated whose filter medium body 2 on the clean side is provided with two support elements 5, each in the form of a support pad with round cross section. Each support element 5 corresponds to that of the embodiment of FIG. 1 but the two support elements 5 are arranged off-center on the clean side 2b of the filter medium body 2 in FIG. 4. Each support element 5 is arranged at a spacing relative to the rim-side circumferentially extending seal 3.

As shown in FIG. 5, two counter support elements 10 in the form of a support sleeve are arranged on the inner side of the housing cover 9 and are correlated with the two support elements 5 on the clean side 2b of the filter medium body 2. When the housing cover 9 is closed, the end face of each counter support element 10 is contacting the convex outwardly curved exterior side of the respective correlated support element 5 on the filter medium body 2.

Figure 6:
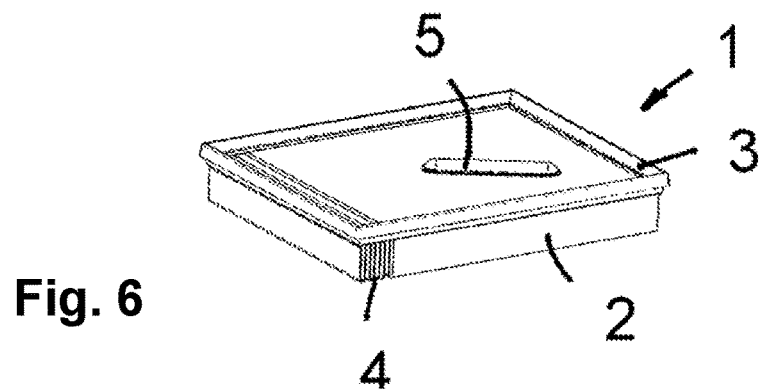
FIG. 6 is a filter element in a further embodiment variant in which the support element on the clean side is embodied strip-shaped or rod-shaped.
Figure 7:
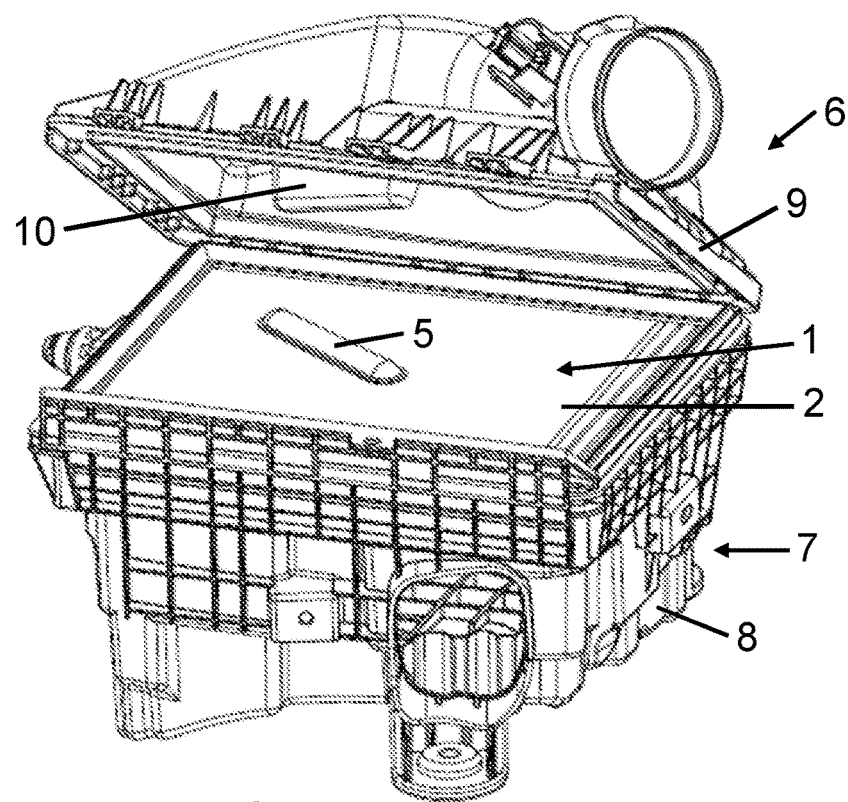
FIG. 7 is a filter device with a filter element according to FIG. 6 and a counter support element on the housing cover which is matched to the shape of the support element on the filter element.

FIGS. 6 and 7 show a further embodiment with a filter element 1 whose filter medium body 2 on the clean side carries an elongate support element 5 that is embodied strip-shaped or rod-shaped. The configuration of the support element 5 corresponds to that of the preceding embodiments. The elongate support element 5 is positioned at a slant on the clean side of the filter medium body 2; the longitudinal axis of the support element 5 extends non-parallel to the longitudinal side as well as to the narrow side of the parallelepipedal filter medium body 2. The support element 5 is arranged at a spacing from the rim-side circumferentially extending seal 3.

The counter support element 10 on the inner side of the housing cover 9 is matched to the shape of the support element 5 and comprises also an elongate cross section.

Figure 8:
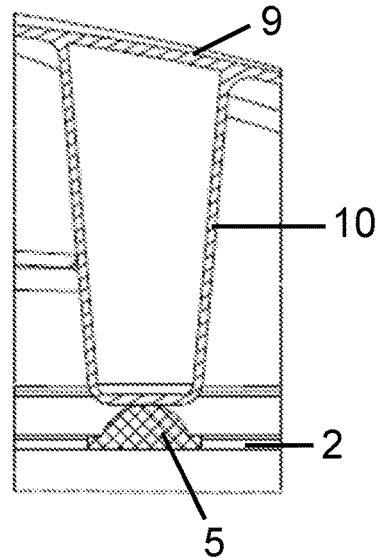
FIG. 8 is a support element on the filter medium body and a counter support element on the housing cover in a section illustration, wherein the end face of the counter support element is designed as a flat surface which contacts the convex outwardly curved support element.

In FIG. 8, a section of the support element 5 on the filter medium body 2 and of the counter support element 10 on the inner side of the housing cover 9 is illustrated. The pad-shaped support element 5 and the counter support element 10 embodied as a support sleeve are contacting each other. The end face of the counter support element 10 is designed as a flat surface which is contacting the convex outwardly curved exterior side of the support element 5 on the filter medium body 2. Due to the convexly curved exterior side there is only a small contact surface area between support element 5 and counter support element 10 so that the friction is reduced and relative movements between the components in transverse direction are associated with correspondingly reduced friction forces.

Figure 9:
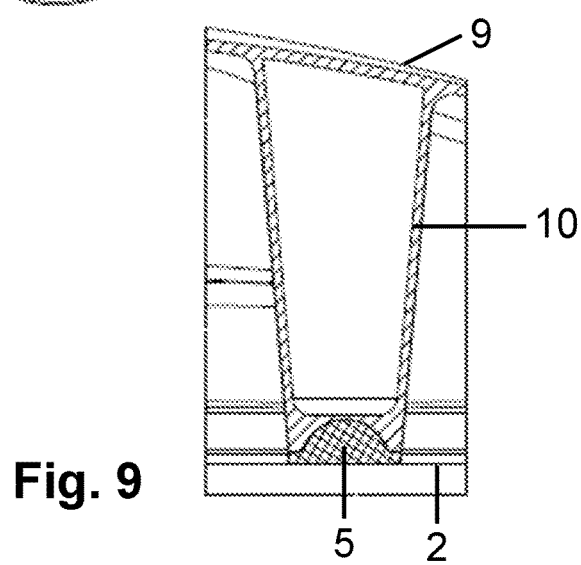
FIG. 9 is a further section illustration of a support element and a counter support element, wherein the end face of the counter support element is curved concavely inwardly and receives the support element.

FIG. 9 shows an embodiment variant of the contact between support element 5 and counter support element 10. The end face of the counter support element 10 which is embodied as a support sleeve, is concavely curved inwardly and is matched to the contour of the convex outwardly curved support element 5. When the housing cover 9 is closed, the concave recess at the end face of the counter support element 10 engages across the convex outwardly curved exterior side of the support element 5. The end face rim area of the counter support element 10 is contacting a circumferentially extending support collar of the support element 5 that surrounds the convex outwardly curved centric section of the support element 5.

What is claimed is:

1. A filter element comprising:
   a filter medium body comprising a raw side and a clean side;
   a support element connected to the filter medium body and configured to support the filter element in a receiving filter housing, the support element formed as a support pad having an outer circumference and projecting axially outward away from the clean side of the filter medium body, the support pad having an exterior support surface that fully covers and closes over an interior of the outer circumference of the pad;
   a support element connected to the filter medium body and configured to support the filter element in a receiving filter housing;
   the support element arranged on the clean side of the filter medium body;
   the support element separated from the raw side of the filter medium body by a material of the filter medium body.

2. The filter element according to claim 1, wherein
   at least a part of the support element is resting on a clean side exterior surface of the filter medium body.

3. The filter element according to claim 1, wherein
   the support element is arranged at a spacing from a lateral rim provided at the clean side of the filter medium body.

4. The filter element according to claim 1, wherein the exterior support surface of the support element is convex outwardly curved.

5. The filter element according to claim 1, wherein
   the filter medium body is a folded filter,
   wherein the support element extends across at least two neighboring folds of the folded filter.

6. The filter element according to claim 5, wherein
   the support element projects into an intermediate fold space between the at least two neighboring folds but is spaced from a fold bottom of the intermediate fold space.

7. The filter element according to claim 1, wherein
   the support element is formed of PUR (polyurethane) foam.

8. The filter element according to claim 1, further comprising
   a circumferentially extending seal arranged on the clean side of the filter medium body.

9. The filter element according to claim 1, configured to filter a gas.

10. The filter element according to claim 1, configured as an air filter.

11. A filter device comprising:
    a filter element comprising
      a filter medium body that comprises
        a raw side and
        a clean side,
      the filter element further comprising
        a support element connected to the filter medium body and arranged on the clean side of the filter medium body, the support element formed as a support pad projecting axially outward away from the clean side of the filter medium body, the support pad having an exterior support surface that fully covers and closes over an interior of the outer circumference of the pad;
      wherein the support element is separated from the raw side of the filter medium body by a material of the filter medium body;
    a filter housing configured to receive the filter element and comprising
      a counter support element correlated with the support element on the filter medium body of the filter element,
      wherein the support element of the filter element is configured to support the filter element on the counter support element in the filter housing.

12. The filter device according to claim 11, wherein
    the counter support element is arranged on an inner side of a housing component of the filter housing.

13. The filter device according to claim 12, wherein
    the counter support element and the housing component are embodied together as one piece.

14. The filter device according to claim 11, wherein
    the counter support element is a support sleeve with an end face,
    wherein the end face, in a support position on the support element on the filter medium body, is contacting against an exterior side of the support element on the filter medium body.

15. The filter device according to claim 14, wherein the end face of the counter support element is a flat surface.

16. The filter device according to claim 14, wherein the end face of the counter support element comprises a concave inwardly curved contour.

\* \* \* \* \*